United States Patent [19]

Daniels

[11] 4,257,401
[45] Mar. 24, 1981

[54] SOLAR HEAT COLLECTOR

[76] Inventor: Ronald M. Daniels, 112 Westhill Rd., Elliot Lake, Ontario, Canada, P5A 1A7

[21] Appl. No.: 109,160
[22] Filed: Jan. 2, 1980
[51] Int. Cl.³ .............................................. F24J 3/02
[52] U.S. Cl. .................................. 126/439; 126/440; 350/445
[58] Field of Search ............... 126/440, 439, 438, 436, 126/424, 900, 451; 350/202, 211, 288

[56] References Cited

U.S. PATENT DOCUMENTS

| 1,683,266 | 9/1928 | Shipman | 126/440 |
| 3,899,145 | 4/1975 | Stephenson | 350/202 |
| 4,002,032 | 6/1977 | Bash | 126/424 |
| 4,201,197 | 5/1980 | Dismer | 126/440 |

FOREIGN PATENT DOCUMENTS

| 197805 | 5/1978 | Fed. Rep. of Germany | 126/440 |
| 2003266 | 3/1978 | United Kingdom | 126/438 |

*Primary Examiner*—Samuel Scott
*Assistant Examiner*—G. Anderson

[57] ABSTRACT

The present invention relates to a solar heat collecting system comprising a lens focusing sunlight at a flat mirror which is spaced from the lens by half of its focal length, the flat mirror reflects the sunlight back at the lens and brings the focused sunlight to a focal point. Located at that focal point is a mirrored funnel which funnels the light inwardly to a light piping system which pipes the light still in light form, to a boiler where it is finally converted to thermal energy.

11 Claims, 6 Drawing Figures

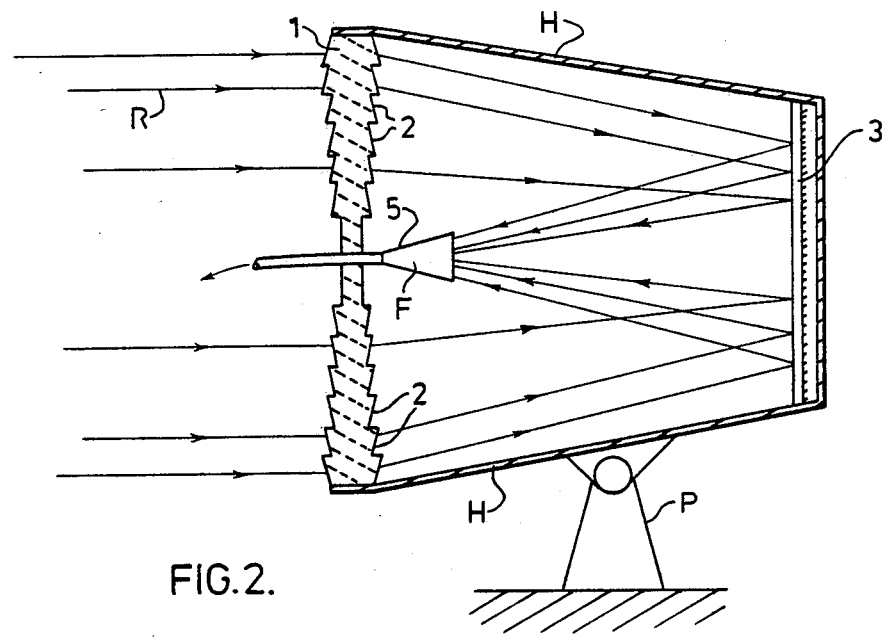
FIG. 2.
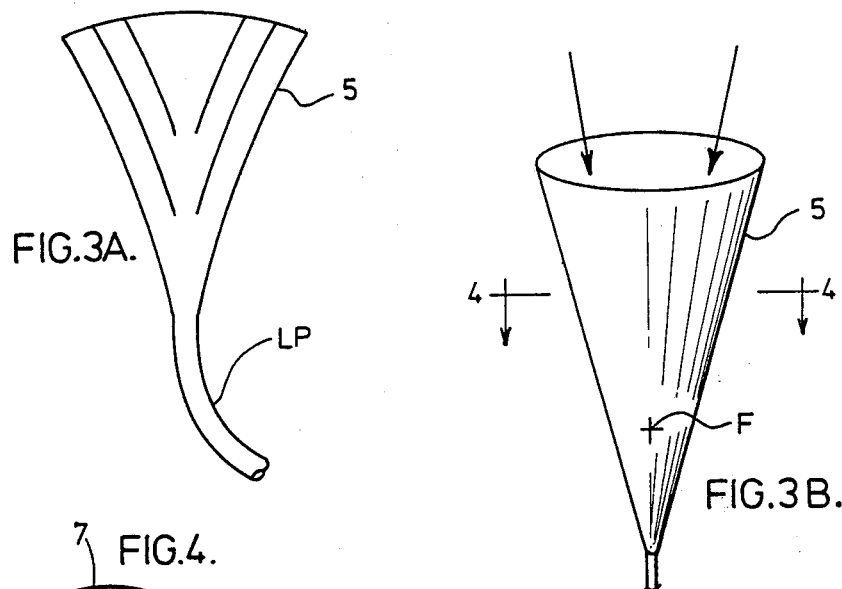
FIG. 3A.
FIG. 3B.
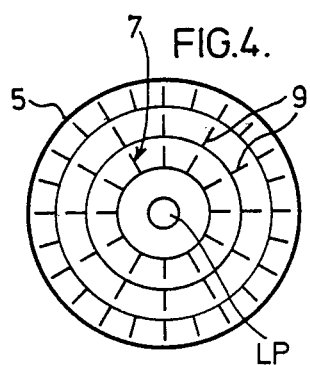
FIG. 4.
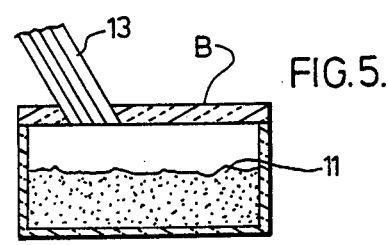
FIG. 5.

SOLAR HEAT COLLECTOR

FIELD OF THE INVENTION

The present invention relates to a system for collecting thermal energy from sunlight.

BACKGROUND OF THE INVENTION

As a result of the recent energy crisis, more and more attempts are being made to collect the heat given off by the sun so that that collected heat can be put to various uses where other forms of energy have been used in the past.

For the most parts, the recently developed solar heat collecting arrangements as well as their predecessors are extremely complicated and require many different parts, most of which require frequent maintenance. As a result, the cost of both setting up and operating the prior art arrangements is extremely high. This high cost is even harder to justify in light of their poor efficiency which is limited by the fact that much of the collected sunlight is lost as heat energy before it can be put to good use. As a general rule, standard heat collecting systems operate at an unacceptable 35% efficiency due to their large surface areas undesirably radiating off much of the collected heat energy.

The present invention relates to a solar heat collecting system which is generally much less complicated and less expensive than conventional systems. At the same time, the solar heat collecting system of the present invention operates above the standard 35% efficiency point by minimizing the surface areas and heat losses.

The solar heat collecting system of the present invention comprises a lense which is pointed at the sun having a focal length for focusing sunlight at a flat reflective surface. The flat reflective surface is spaced from the lense by half of its focal length and is positioned to reflect the sunlight back at the lens and to bring sunlight to a focal point. Located at this focal point is a symmetrical funnel means having an inwardly tapered reflective inner surface for funnelling the sunlight to light piping means. The light piping means carries the sunlight still in the light energy form to a boiler where it is ultimately converted to thermal energy. The thermal energy collected at this point is then put to efficient use.

As a result of the construction of the present invention, both the flat reflective surface and the funnelling means may be totally enclosed against the entrance of dirt, dust, moisture, etc., which essentially eliminates the requirement of constant maintenance to these components. Therefore, both the cost of setting up and operating the present invention structure is much lower than prior art arrangements. In addition, its efficiency relative to its cost is considerably greater than standard arrangements due to the fact that the collected sunlight is maintained in a light energy form until it reaches the boiler which greatly reduces inefficient heat losses.

BRIEF DISCUSSION OF THE DRAWINGS

The above, as well as other features and advantages of the present invention will be described in greater detail according to the preferred embodiments of the present invention wherein:

FIG. 2 is a sectional view taken through the area indicated at A in FIG. 1.

FIG. 3 is an enlarged view of a preferred funnel arrangement according to the present invention.

FIG. 4 is a section taken along the lines 4—4 of FIG. 3.

FIG. 5 is a section taken through the area indicated at B in FIG. 1.

Figure 1:
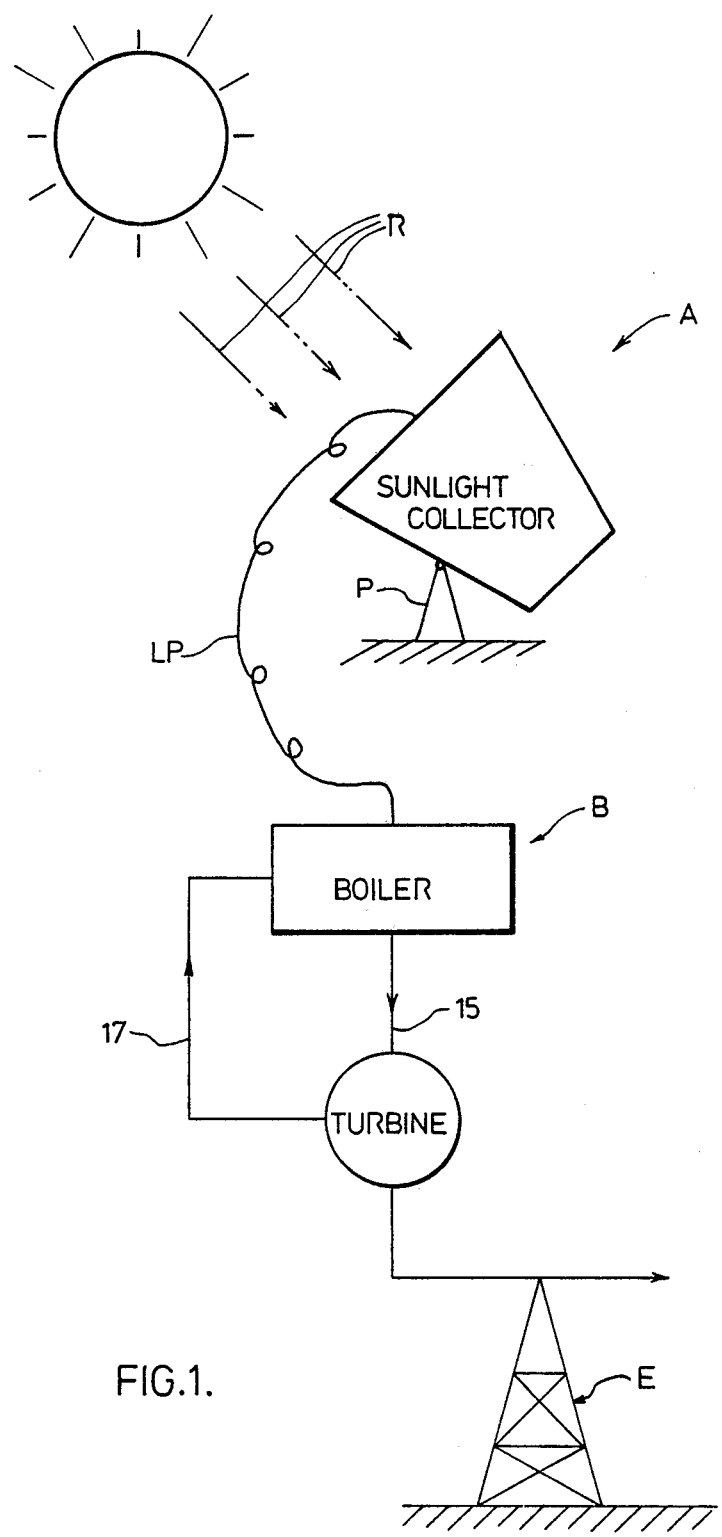
FIG. 1 is an overall schematic of a preferred solar heat collecting system of the present invention.

An overall preferred scheme for the present invention shown in FIG. 1 comprises a sunlight collector pivotally mounted as indicated at P to follow the path of the sun for maximum exposure to the sun's rays indicated at R. A light pipe shown at LP is connected to the sun collector for transmitting the collected sunlight to the boiler B where the sunlight is converted to thermal energy. This thermal energy is used to produce steam in the boiler which drives a turbine shown in FIG. 1. This turbine will be preferably used to produce electricity as shown at E for domestic use.

FIG. 2 shows what I refer to as the sunlight collector in greater detail. This collector comprises the forward lens 1 which is directly exposed to the sunrays and which focuses the sunlight passing therethrough at a flat, reflective surface, preferably a flat mirror 3. The sunlight reflects off the flat mirror and back at the lens where the sunlight comes to a focal point F. A funnel 5 is located at the focal point. Funnel 5 has an inner reflective or mirrored surface 7 which reflects and funnels the light inwardly so that it enters the light pipe while remaining in the light energy form.

The light collector is provided with an external housing H extending from the periphery of lens 1 to the periphery of mirror 3. As such, the inner reflective surface of the mirror as well as the entirety of funnel 5 are enclosed within the housing making them essentially maintenance free. This drastically reduces the cost of operation of the present system.

Lens 1 which is preferably circular in shape, is formed from a plurality of integral prismatic segments 2. Each of these segments which acts as a prism, deflects the sunlight entering through the lens in a manner consistent with that of a standard convex lens. However, the prismatic segmented lens of the present invention is much lighter than a conventional convex lens in that it requires less material to perform the same function. The reduced weight of the lens makes it particularly suitable for the tracking of the sun by the light collector. In addition, the shaping of the lens as shown in FIG. 2 reduces the likelihood of its cracking during formation. In the past, there has been a difficulty when molding convex lenses in glass or in plastic due to the thick material cracking internally when cooling. This difficulty is essentially eliminated by the prismatic lens described above.

A preferred arrangement for the funnel 5 is shown in FIG. 4. According to this preferred arrangement, the inner reflective surface 7 of the funnel is provided with a plurality of small ribs 9 which enhance the funnelling action of the funnel in angling the sunlight inwardly to the light pipe.

The light pipe itself, may take a number of forms including a curved glass tube or a fiber optics bundle. Such a bundle consists of a large number of glass filaments, each of which is coated with a reflective material to make the filaments totally internally reflecting. Accordingly, as the sunlight enters one end of the bundle, along the axis of the filaments it is maintained in the light energy form throughout the fiber optics bundle, even though the bundle is curved or bent along its length. The same result is accomplished using the glass tube which is also internally reflecting so that the light is carried to the boiler and enters the boiler as light energy.

A plurality of glass fibers 13 are shown entering the boiler in FIG. 5. The light energy enters the boiler through these glass fibers and strikes powdered material 11 in the form of powder coal or powder graphite to convert the light energy to thermal energy. This conversion causes the water in the boiler to turn to steam. This steam is forced out of the boiler through pipe 15 to drive the turbine. By way of example, there may be up to 100 sunlight collectors feeding each boiler and there may be 10 or more boilers for each steam generator.

Electricity generated by the turbine is usable on a 24 hour basis in which case 2 lakes of different elevation are used by pumping water up during daylight time and larger hydro-electric turbines are used to operate 24 hours or peak loading. The lake on top could have a possible 2 week or so reserve. The rate of lake water evaporation would be considered in the hydro-electric phase of operation. The arrangement may be set up such that solar generated electricity is provided at a constant rate or it may be designed oversized to cover the peaks of industrial and domestic electrical requirements.

The pivot and rotation of the sunlight collector assembly is computer controlled. The computer may be provided with a safety feature to turn the light collector away from the sun in the event of overheating. A desert location is particularly suitable for the present invention as a result of the intensity of the sunlight in such a location.

In view of the description above, it will now be well understood that the present invention which occupies less space than many solar heat collectors and which is relatively uncomplicated, operates on an efficient manner by maintaining the collected sunlight in a light energy form without exposing it to large heat radiating surfaces until it can be efficiently converted to thermal energy. It is also to be appreciated that although various embodiments of the invention have been described herein, in detail, one skilled in the art can make variations to those preferred embodiments without departing from the spirit of the invention or the scope of the appended claims.

The embodiments of the invention in which an exclusive property or privilege is claimed are defined as follows:

1. A solar heat collecting system comprising a lens having a focal length for focusing sunlight at a flat reflective surface which is spaced from said lens by half of said focal length, said flat reflective surface being positioned to reflect the sunlight back at the lens and to bring the sunlight to a focal point; symmetrical funnel means at said focal point, said symmetrical funnel means having an inwardly tapering reflective inner surface for funneling the sunlight to light piping means for piping the light to a boiler where the sunlight is converted to thermal energy.

2. A solar heat collecting system as claimed in claim 1 wherein said flat reflective surface is a flat mirror.

3. A solar heat collecting system as claimed in claim 1 wherein said light piping means is a glass tube.

4. A solar heat collecting system as claimed in claim 1 wherein said light piping means is a fibre optics bundle.

5. A solar heat collecting system as claimed in claim 1 wherein said funnel means comprises a funnel having a plurality of inner mirrored surfaces for funneling the light inwardly to a glass tube for carrying the light to the boiler.

6. A solar heat collecting system as defined in claim 5 wherein said funnel is provided on its inner surface with a plurality of small ribs to enhance the inward funneling of the sunlight to the glass tube.

7. A solar heat collecting system as defined in claim 2, wherein said flat mirror and said funnel means are enclosed within said system to essentially eliminate maintenance to the flat mirror and the funnel means.

8. A solar heat collecting system as defined in claim 1 wherein said lens is essentially circular around its periphery and is formed across its diameter by a plurality of integral generally prismatic segments focusing the sunlight inwardly to the flat reflective surface.

9. A solar heat collecting system as defined in claim 8 wherein said prismatic segments are of increasing size with increasing diameter.

10. A solar heat collecting system as claimed in claim 1 wherein said boiler is partially filled with a powder material selected from the group of powder materials consisting of powder coal and powder graphite for converting the sunlight to thermal energy.

11. A solar heat collecting system as defined in claim 7 wherein said lens, said flat mirror and said funneling means are fixed relative to one another and are mounted on pivot means for following the sun during its travel across the sky for maximum exposure to the sunlight.

* * * * *